INVENTOR.
Howard L. Halbach
BY Bradley + Bee
ATTORNEYS.

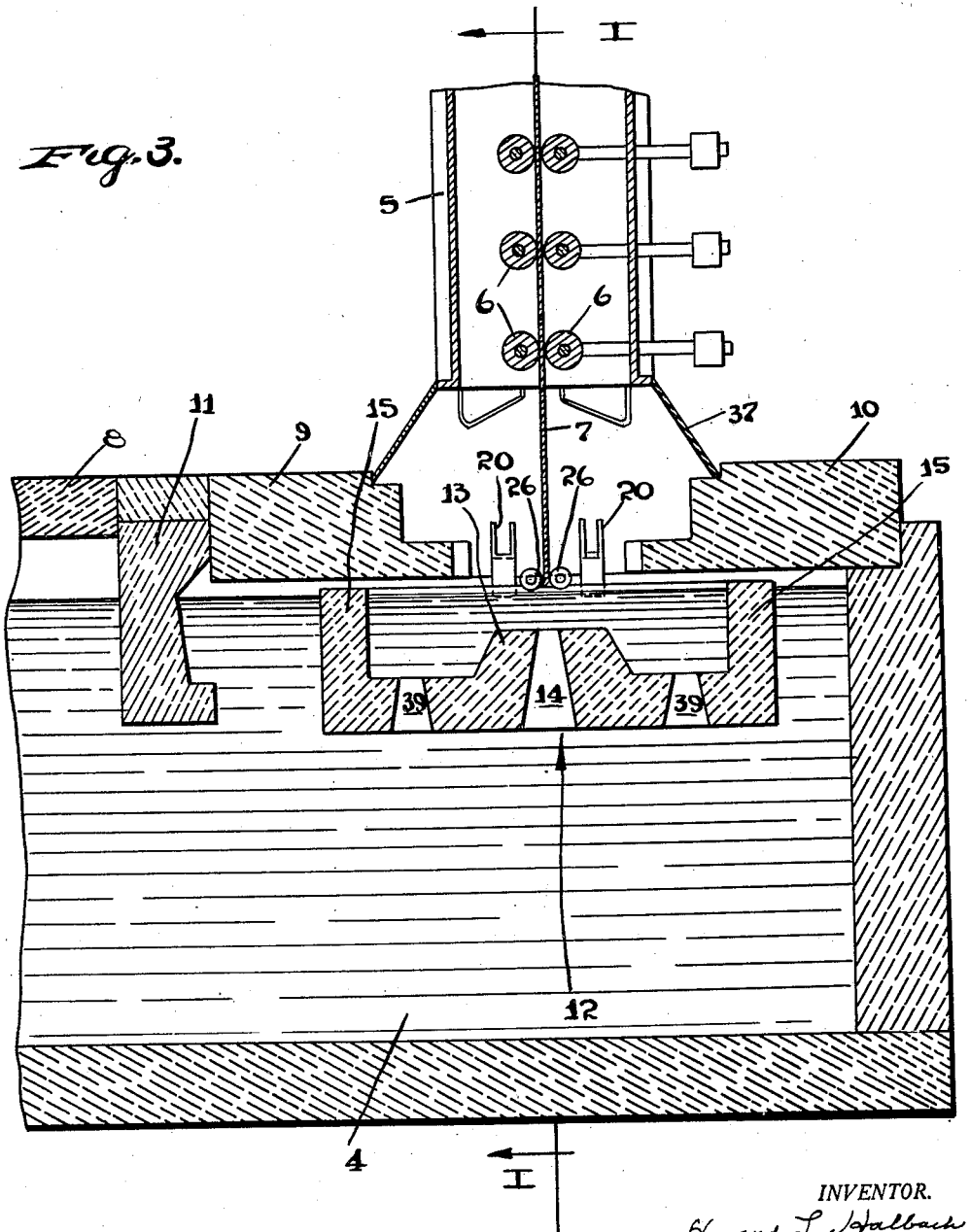

Feb. 1, 1938. H. L. HALBACH 2,106,890
APPARATUS FOR MAKING SHEET GLASS
Filed Dec. 24, 1935  4 Sheets-Sheet 4
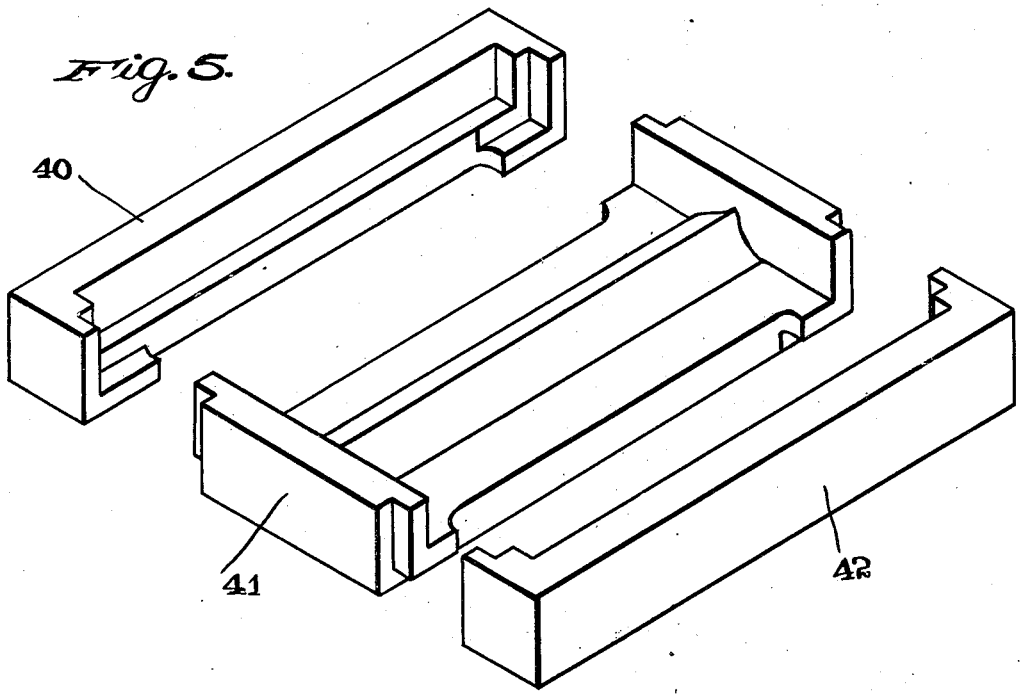
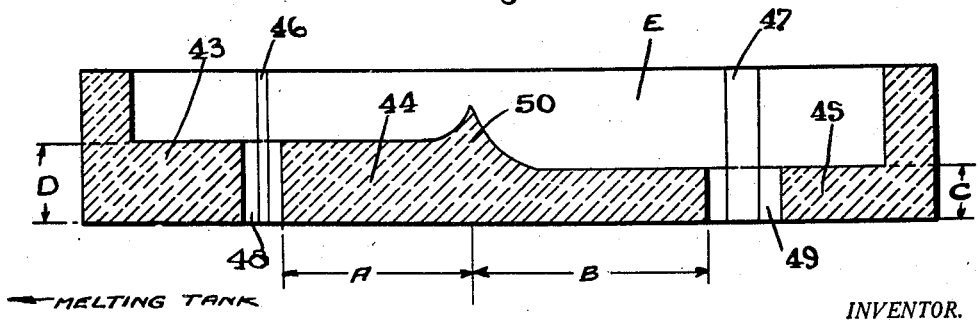

Patented Feb. 1, 1938

2,106,890

UNITED STATES PATENT OFFICE 2,106,890

APPARATUS FOR MAKING SHEET GLASS

Howard L. Halbach, Clarksburg, W. Va., assignor to Pittsburgh Plate Glass Company, a corporation of Pennsylvania Application December 24, 1935, Serial No. 56,064

8 Claims. (Cl. 49—17)

The invention relates to apparatus for making sheet glass by a continuous drawing operation, and particularly to apparatus of the Slingluff type, in which the glass is drawn through a vertical leer from a relatively large, deep body of glass. In apparatus of this type, difficulty is experienced in maintaining the body of glass on the two sides of the line of draw of uniform temperature, and also in preventing the glass beneath the edges of the sheet from cooling too rapidly. This results in strain in the body of the sheet, and in edges which are too hard, and in some cases, too heavy. It also causes a diagonal waviness which is apparent in the surface of the sheet. The primary object of the present invention is to overcome these difficulties and provide a construction which results in the maintenance of a more uniform temperature on the opposite sides of the line of draw, and a higher temperature in those portions of the bath from which the edges of the sheet are generated.

Figure 1:
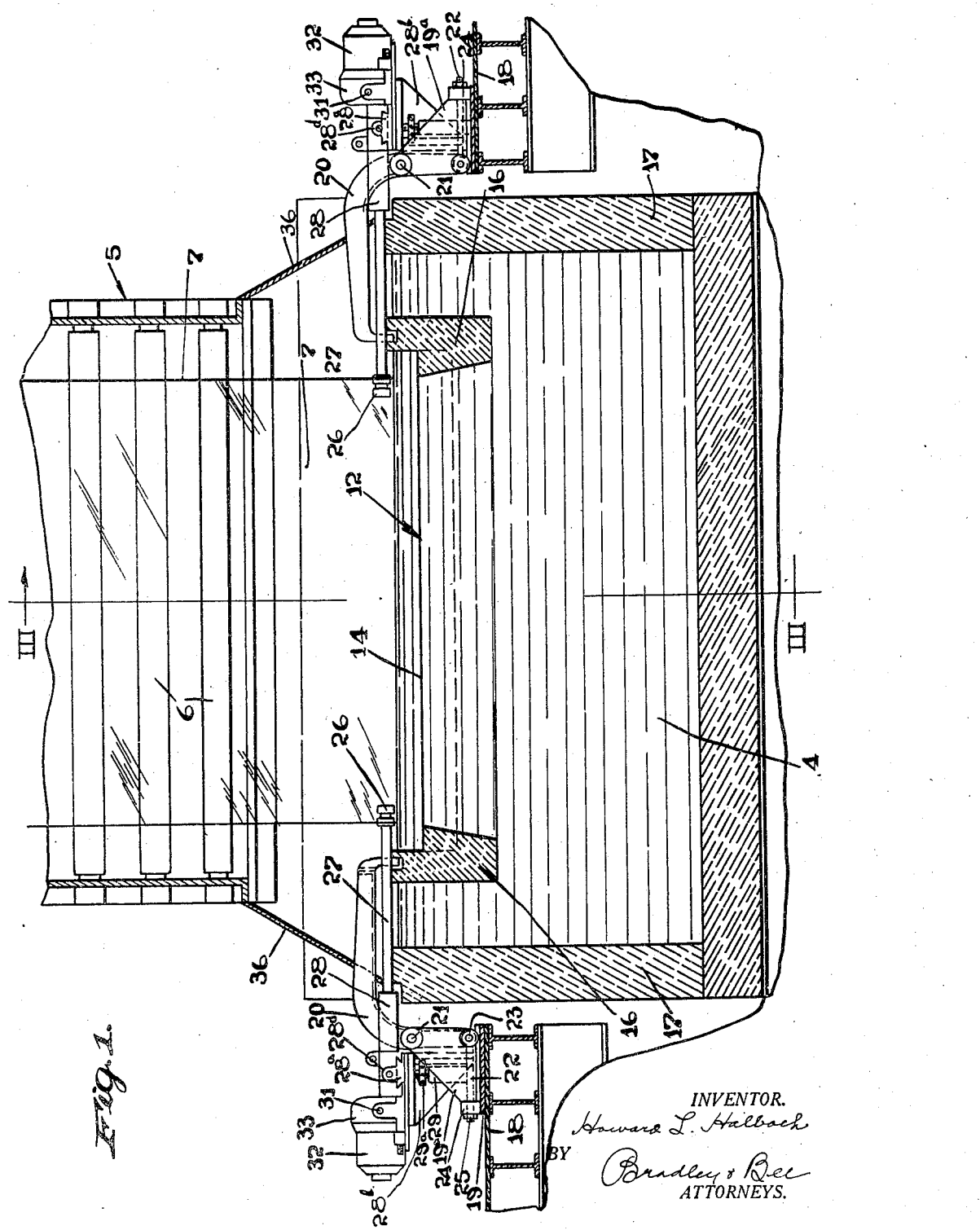
Figure 2:
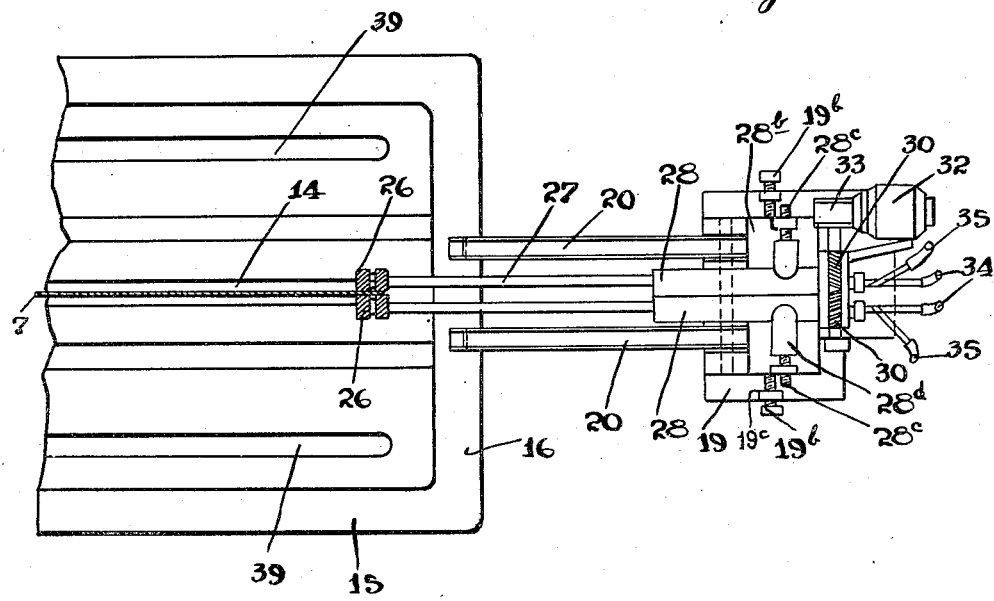
Figure 4:
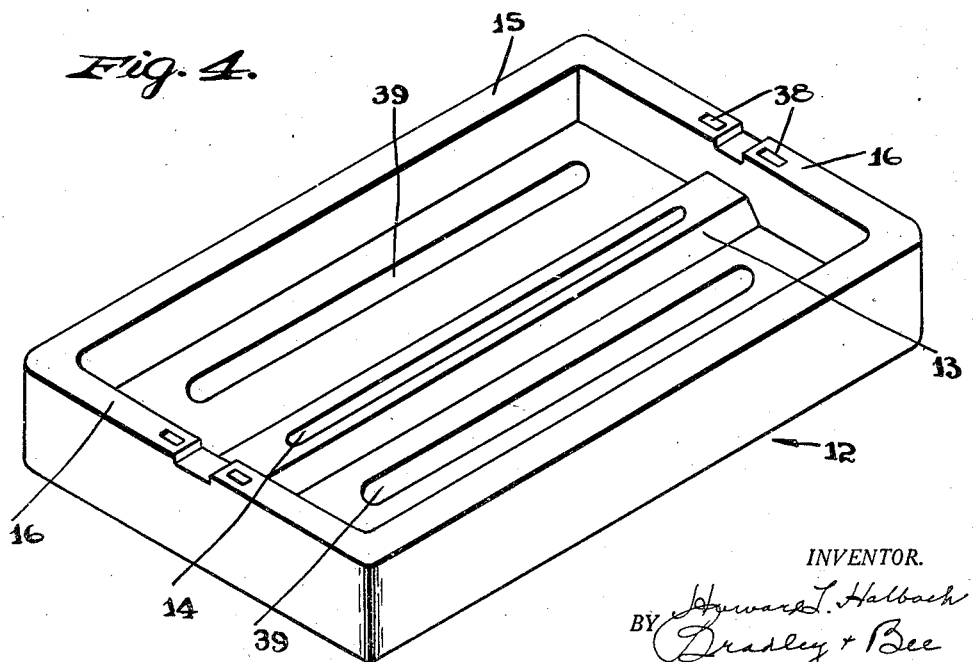

Briefly stated, the desired result is accomplished by the use of a pot from which the draw occurs, having its edges above the surface of the glass bath and its ends spaced away from the side walls of the forehearth or tank, so that the generation of the edges of the sheet occurs from points relatively remote from the side walls of the tank. As a result, the cooling effect of such side walls is reduced, the pot being adjustable vertically to permit of a regulating effect upon the temperature of the body of molten glass within the confines of the pot. A further object of the invention is to adapt the Slingluff drawing system for use with edge holding means for the sheet of the roller type (Colburn). One embodiment of the invention is illustrated in the accompanying drawings, wherein:

Figure 1 is a vertical section through the apparatus on the line I—I of Fig. 3. Fig. 2 is a fragmentary plan view partially in section. Fig. 3 is a section on the line III—III of Fig. 1. Fig. 4 shows the pot in perspective. Fig. 5 is a perspective view of a pot of the sectional type. And Fig. 6 is a section through a modified pot construction.

Referring to the drawings, 4 is a drawing kiln or extension which is connected at its left hand end (Fig. 3) with a suitable melting tank, which is not shown. Mounted above the kiln is a vertical leer 5 of the Fourcault type provided with pairs of driven rolls 6, 6, which grip the side faces of the sheet 7 and draw it up continuously from the bath, the glass being cut off in sections as it emerges from the top of the leer in the usual manner. The surface of the glass in the kiln is partially covered by the refractory blocks 8, 9 and 10, and a skim bar 11 is employed extending transversely of the kiln, all of which construction is well known in the art.

Located in the glass bath and extending transversely of the kiln is the draw pot 12 provided with the center rib 13 having therethrough a slot 14 which is approximately co-extensive in length with the width of the sheet. At the edges of the pot are the side walls 15, 15 (Fig. 3) and the end walls 16, 16 which extend slightly above the level of the glass. As indicated in Fig. 1, the end walls 16 are located a substantial distance inward from the side walls 17, 17 of the kiln. At each side of the kiln is a floor structure 18 and upon this floor is mounted a plate 19 which in turn carries a support 19a in the form of a casting, which support carries the pairs of holding down arms 20, 20, which engage the end walls 16, 16 of the pot. These arms merge at their rear ends and are pivoted at 21 upon the support. In order to swing the pair of arms about the pivot 21 and thus regulate the vertical position of the pot in the glass bath, a threaded rod 22 is hooked to a pivot 23 at the lower ends of the arms and extends through a flange 24 on the support 19. By adjusting the nut 25, the inner ends of the rods 20 may be moved up and down to position the draw pot relative to the level of the glass. The support 19a is adjustable on the plate 19 in a horizontal plane longitudinally of the kiln by means of the bolts 19b (Fig. 2) which extend through the lug 19c at the ends of the plate and engage the ends of the support.

Also mounted on the supports 19 are the edge holding means comprising the pairs of rolls 26, 26 and the means for driving such rolls. The rolls are carried upon the ends of the hollow shafts 27, which shafts are journalled in a pair of sleeves 28. These sleeves are mounted for adjustment toward and from each other on the slide 28a (Fig. 1) carried by a bracket 28b, this being accomplished by screws 28c threaded through upstanding lugs on the bracket, such screws being swivelled at their inner ends in laterally extending bosses 28d integral with the sleeves.

The bracket 28b is itself mounted for sliding vertical adjustment on the support 19a. This adjustment is accomplished by a vertical screw 29 threaded into a boss 29 on the support 19a and having a circular head 29a (Fig. 1) provided with radial holes for the insertion of a turning bar, such head fitting into a suitable notch in the side of the bracket. Provision is thus made for adjusting the apparatus longitudinally of the forehearth, transversely thereof, and also in a vertical direction to meet requirements which arise in using the apparatus. The rolls 26 may further be adjusted toward and from each other (to take care of sheet edges of varying thickness) by means of the screws 28c heretofore described. The hollow shafts 27 are provided at their rear ends with the worm wheels 30, 30 (Fig. 2) and such worm wheels are driven from a worm on the shaft 31 (Fig. 1). This shaft is driven from an electric motor 32 carried upon the casting 28b and operating through suitable reduction gearing in the casing 33.

In operation the edge holding rolls 26, 26 are driven in the same direction as the drawing rolls 6, 6, but their peripheral speed is less so as to provide a holding back action at the edges of the sheet, this method of operation being well-known in the art. The hollow shafts 27, 27 which carry the edge holding rolls are provided with pairs of small pipes so that a circulation of water may be secured through the rolls in order to cool them. These pipes are connected by suitable swivels to the supply pipes 34, 34 and 35, 35, this also being a detail of construction well-known in the art. In order to shield the sheet being drawn from the action of the atmosphere intermediate the lower end of the leer 5 and the surface of the bath, the shield members 36, 36 and 37, 37 are employed.

The details of the pot construction will be seen by reference to Fig. 4. The end walls 16, 16 are provided with the recesses 38, 38 for receiving the ends of the holding-down arms 20, and the bottom of the pot is provided with slots 39, 39 parallel to the rib 13 and extending substantially the length of the pot. These slots provide for a free inflow of glass, so that the glass removed from the pot by the drawing operation is replaced by the flow upward through the slots from the body of molten glass beneath the pot. Since the side and edge walls of the pot project above the surface of the glass bath, the body of glass in the pot is segregated from the main body of the bath and the portion thereof lying on opposite sides of the center line of the pot, which corresponds to the line of draw, may more easily be maintained at more nearly the same temperature than is the case when the ordinary draw bar is employed. Since the end walls 16 of the pot are located inward a substantial distance from the side walls 17, 17 of the kiln, the temperature of the glass in the pot at the points where the edges of the sheets are generated, that is at the points where the edge holding rolls operate, is affected to only a slight degree by the loss of heat through the walls 17, 17.

It is, therefore, relatively easy to maintain the glass at these points of edge generation at a proper temperature for satisfactory drawing. As a result, the glass in the pot, from one edge of the sheet being formed to the other, is at relatively uniform temperature and the edge portions are not chilled to too great an extent, as is often the case where the edge of the sheet is generated in close proximity to the side walls 17, 17 of the tank. There is also little tendency of the glass in the pot beneath the points of edge generation to progressively cool to such a point that proper drawing is interfered with. The net result is that the glass sheet has less tendency to warp than would otherwise be the case, and in addition to having softer edges, is less subject to diagonal waviness, so that the product has a better appearance than would otherwise be the case. It will be seen that the advantages above recited are incident to the use of the pot with the end walls 16, 16 spaced well inward from the side walls of the tank and intermediate such side walls and the points at which the edge holding means for the sheet are located. The adjustment heretofore referred to of the arms 20 and the parts which carry the edge holding means permit of the ready positioning of the pot and edge holding rolls to meet operating conditions which arise in the use of an apparatus of this kind.

Fig. 5 shows a modified pot construction, in which the pot is divided into the three sections 40, 41 and 42 instead of in one piece, the meeting edges being formed with interlocking tongues and recesses, as shown, to assist in holding the parts in proper relative position. A pot of this kind is easier to handle than a one piece pot and less subject to cracking in handling and in service. It also permits of an adjustment of the width of the inlet slots through the bottom in order to regulate the relative temperatures of the glass in the two ends of the pot, as pointed out in connection with the Fig. 6 construction described below. In this construction, as in that of Fig. 6, the slot 14 (Fig. 3) through the central ridge of the pot is omitted.

In the Fig. 6 construction, the pot is made in three sections 43, 44 and 45, and spacers 46 and 47 in the form of clay strips may be employed to regulate the width of the feed slots 48 and 49. This assists in securing a uniform temperature of glass on the two sides of the rib 50, which defines the position of the line of draw of the glass sheet. Normally the glass will run hotter on the side of 30 the ridge next the melting tank, so that the slot 48 is made narrower than the slot 49. It is difficult to determine the proper relative width except by trial, and the use of the liners 46 and 47 permits the necessary adjustment to be made. The dimension B is also made greater than the dimension A, and the dimension D greater than the dimension C, in order to still further compensate for the higher temperature which normally exists on the side of the rib 50 next to the melting tank, as compared with the temperature on the other side of the ridge. These expedients all tend to give a higher temperature in the section E of the pot than would be the case if the dimensions B and C were the same as A and D respectively. The differences in dimensions will depend on conditions. The differences are exaggerated in the drawing for clearness of illustration. The principle involved is applicable to draw bars, as well as to pots, the portion of the structure comprehended by the dimensions A and B constituting a good illustration of a draw bar suitable for use in the Slingluff drawing system.

What I claim is:

1. In combination in apparatus for making sheet glass including a drawing kiln connected at one end with a melting tank, and means for drawing a glass sheet continuously upward therefrom in a plane transverse to the kiln, a pot of refractory material also extending transversely of the kiln with its edges above the level of the bath and provided with a transverse rib for defining the line of draw and with inlet openings through its bottom on opposite sides of the ridge to permit a free flow of glass to the interior thereof, the end walls of the pot being spaced away from the side walls of the kiln, and edge holding means for the sheet above the surface of the glass in the pot and inward of the end walls thereof, the inlet opening on the side of the pot nearest the melting tank being nearer to said rib than the other inlet opening.

2. In combination in apparatus for making sheet glass including a drawing kiln connected at one end with a melting tank, and means for drawing a glass sheet continuously upward therefrom in a plane transverse to the kiln, a pot of refractory material also extending transversely of the kiln with its edges above the level of the bath and provided with a transverse rib for defining the line of draw and with inlet openings through its bottom on opposite sides of the ridge to permit a free flow of glass to the interior thereof, the end walls of the pot being spaced away from the side walls of the kiln, and edge holding means for the sheet above the surface of the glass in the pot and inward of the end walls thereof, the bottom surface of the pot on the side of the rib nearest the melting tank being at a higher level than the bottom surface on the other side of the rib.

3. In combination in apparatus for making sheet glass including a drawing kiln connected at one end with a melting tank, and means for drawing a glass sheet continuously upward therefrom in a plane transverse to the kiln, a pot of refractory material also extending transversely of the kiln with its edges above the level of the bath and provided with a transverse rib for defining the line of draw and with inlet openings through its bottom on opposite sides of the ridge to permit a free flow of glass to the interior thereof, the end walls of the pot being spaced away from the side walls of the kiln, and edge holding means for the sheet above the surface of the glass in the pot and inward of the end walls thereof, the inlet opening on the side of the pot nearest the melting tank being of less width than the other inlet opening.

4. In combination in apparatus for making sheet glass including a drawing kiln connected at one end to a melting tank, and means for drawing a glass sheet continuously upward therefrom in a plane transverse to the kiln, a pot of refractory material also extending transversely of the kiln with its edges above the level of the bath and provided with inlet openings through its bottom on opposite sides in the line of draw to permit a free flow of glass to the interior thereof, the end walls of the pot being spaced away from the side walls of the kiln, a support at each side of the kiln, a pair of spaced arms mounted on each support for swinging movement in a vertical direction and adapted to engage the end wall of the pot, adjusting means for the arms for regulating the vertical position of the pot with respect to the level of the glass in the kiln, and a pair of driven edge holding rolls carried by each support between the arms constituting the pair and lying above the level of the glass in the pot.

5. In combination in apparatus for making sheet glass including a drawing kiln connected at one end to a melting tank, and means for drawing a glass sheet continuously upward therefrom in a plane transverse to the kiln, a pot of refractory material also extending transversely of the kiln with its edges above the level of the bath and provided with inlet openings through its bottom on opposite sides of the line of draw to permit a free flow of glass to the interior thereof, the end walls of the pot being spaced away from the side walls of the kiln, a support at each side of the kiln, a pair of spaced arms mounted on each support for swinging movement in a vertical direction and adapted to engage the end wall of the pot, adjusting means for the arms for regulating the vertical position of the pot with respect to the level of the glass in the kiln, a pair of driven edge holding rolls carried by each support between the arms constituting the pair and lying above the level of the glass in the pot, and means whereby the rolls may be adjusted longitudinally of the kiln, transversely thereof, and in a vertical direction.

6. In combination in apparatus for making sheet glass including a drawing kiln connected at one end with a melting tank, and means for drawing a glass sheet continuously upward therefrom in a plane transverse to the kiln, a pot of refractory material also extending transversely of the kiln with its edges above the level of a bath of molten glass contained in said drawing kiln and provided with a transverse rib for defining the line of draw, inlet openings through its bottom on opposite sides of the rib and spaced therefrom and of a size sufficient to permit molten glass to enter said pot to fill it to the level of the bath in said drawing kiln, the end walls of said pot being remote from the side walls of the kiln, said pot being entirely surrounded by the molten glass contained in the drawing kiln, and edge holding means for the sheet of glass being drawn positioned above the surface of the molten glass in the pot and inward of the end walls of said pot.

7. In combination in appartus for making sheet glass including a drawing kiln connected at one end with a melting tank, and means for drawing a glass sheet continuously upward therefrom in a plane transverse to the kiln, a pot of refractory material also extending transversely of the kiln with its edges above the level of a bath of molten glass contained in said drawing kiln and provided with a transverse rib for defining the line of draw, inlet openings through its bottom on opposite sides of the rib and spaced therefrom and of a size sufficient to permit molten glass to enter said pot to fill it to the level of the bath in said drawing kiln, the end walls of said pot being remote from the side walls of the kiln, said pot being entirely surrounded by the molten glass contained in the drawing kiln, and edge holding means for the sheet of glass being drawn positioned above the surface of the molten glass in the pot and inward of the end walls thereof, said pot being in three sections with lines of division extending transversely of the pot at said openings to permit a variation of the width of the openings.

8. In combination in apparatus for making sheet glass including a drawing kiln connected at one end to a melting tank, and means for drawing a glass sheet continuously upward therefrom in a plane transverse to the kiln, a pot of refractory material also extending transversely of the kiln with its edges above the level of a bath of molten glass contained in said drawing kiln and provided with a transverse rib for defining the line of draw, inlet openings through its bottom on opposite sides of the rib and spaced therefrom and of a size sufficient to permit molten glass to enter said pot to fill it to the level of the molten bath in said drawing kiln, the end walls of said pot being remote from the side walls of the kiln, said pot being entirely surrounded by the molten glass contained in the drawing kiln, means for adjusting the pot vertically in the bath, and vertically adjustable edge holding means for the sheet of glass being drawn positioned above the surface of the molten glass in the pot and inward of the end walls of said pot.

HOWARD L. HALBACH.